(12) United States Patent
Moriyama et al.

(10) Patent No.: US 11,250,578 B2
(45) Date of Patent: Feb. 15, 2022

(54) PROJECTION INDICATION DEVICE, PARCEL SORTING SYSTEM, AND PROJECTION INDICATION METHOD

(71) Applicant: PANASONIC INTELLECTUAL PROPERTY MANAGEMENT CO., LTD., Osaka (JP)

(72) Inventors: Takaaki Moriyama, Kanagawa (JP); Takaaki Idera, Kanagawa (JP); Shohji Ohtsubo, Kanagawa (JP); Pongsak Lasang, Singapore (SG); Takrit Tanasnitikul, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 16/624,678

(22) PCT Filed: May 16, 2018

(86) PCT No.: PCT/JP2018/018945
§ 371 (c)(1),
(2) Date: Dec. 19, 2019

(87) PCT Pub. No.: WO2019/003688
PCT Pub. Date: Jan. 3, 2019

(65) Prior Publication Data
US 2020/0111221 A1    Apr. 9, 2020

(30) Foreign Application Priority Data
Jun. 30, 2017   (JP) .............................. JP2017-129576

(51) Int. Cl.
*G06T 7/00* (2017.01)
*G06T 7/292* (2017.01)
(Continued)

(52) U.S. Cl.
CPC .............. *G06T 7/292* (2017.01); *G06T 7/246* (2017.01); *G06T 7/90* (2017.01); *H04N 5/247* (2013.01);
(Continued)

(58) Field of Classification Search
CPC .......... G06T 7/292; G06T 7/246; G06T 7/90; G06T 7/20; G06T 7/248; G06T 7/337;
(Continued)

(56) References Cited

U.S. PATENT DOCUMENTS 5,920,056 A * 7/1999 Bonnet ..................... B07C 3/14
                                                    235/383
5,923,017 A * 7/1999 Bjorner .................... B07C 3/14
                                                    235/385

(Continued)

FOREIGN PATENT DOCUMENTS

| JP | 2006-349924 | 12/2006 |
| WO | 2015/145982 | 10/2015 |

OTHER PUBLICATIONS

International Search Report (ISR) from International Searching Authority (Japan Patent Office) in International Pat. Appl. No. PCT/JP2018/018945, dated Jul. 10, 2018.

*Primary Examiner* — Jose L Couso
(74) *Attorney, Agent, or Firm* — Greenblum & Bernstein, P.L.C.

(57) ABSTRACT

There is provided a projection indication device that generates a projection image to be projected on parcel based on sensing information of the parcel, the device including: a processor; and a memory, in which by cooperating with the memory, the processor specifies parcel based on a distance image of the parcel included in sensing information, tracks the parcel based on a color image of the parcel included in the sensing information, and tracks the parcel based on the distance image of the parcel in a case where the color image (Continued)

of the parcel on which a projection image is projected includes a white region expressed in white which is not an original gradation.

11 Claims, 6 Drawing Sheets

(51) Int. Cl.
  *G06T 7/246* (2017.01)
  *G06T 7/90* (2017.01)
  *H04N 5/247* (2006.01)
  *H04N 9/04* (2006.01)
  *G06Q 50/28* (2012.01)

(52) U.S. Cl.
  CPC ............. *H04N 9/045* (2013.01); *G06Q 50/28* (2013.01); *G06T 2207/10024* (2013.01); *G06T 2207/10028* (2013.01); *G06T 2207/20221* (2013.01)

(58) Field of Classification Search
  CPC .. G06T 7/521; G06T 7/62; G06T 7/70; G06T 2207/10024; G06T 2207/10028; G06T 2207/20221; G06T 2207/20092; G06T 2200/08; G06T 2200/24; G06T 19/00; H04N 5/247; H04N 5/74; H04N 9/045; G07B 17/00661; G07B 2017/00298; G07B 2017/00685; G07B 2017/00701; G07B 2017/00709; G07B 2017/00717; G06Q 50/28; G06Q 10/087; B07C 7/005; B07C 3/18; B07C 3/20; B07C 3/00; B07C 3/02; B07C 3/08; B07C 3/14; B65G 1/137; B65G 1/1375; B65G 15/00; B65G 2209/04; B65G 2209/06; B65G 43/08; G03B 21/14; G05B 15/02; G06K 9/03; G06K 9/00771; G06K 9/325; G06K 9/3233; G06K 9/3266; G06K 9/3283; G06K 9/344; G06K 9/00261; G06K 9/4652; G06K 9/00624; G06K 9/0063; G06K 2009/3291; G06K 7/1447; G06K 7/1439; G06K 7/1443; G06K 7/1456; G06K 7/00; G06K 7/10861
  See application file for complete search history.

(56) References Cited

U.S. PATENT DOCUMENTS

| | | | |
|---|---|---|---|
| 7,063,256 B2* | 6/2006 | Anderson | B07C 3/20 235/385 |
| 7,090,134 B2 | 8/2006 | Ramsager | |
| 11,057,590 B2* | 7/2021 | Seiger | G06Q 10/0833 |
| 2004/0195320 A1* | 10/2004 | Ramsager | B07C 3/20 235/385 |
| 2009/0114575 A1* | 5/2009 | Carpenter | B07C 7/005 209/584 |
| 2014/0305850 A1* | 10/2014 | Serjeantson | B07C 3/08 209/546 |
| 2017/0066597 A1 | 3/2017 | Hiroi | |
| 2018/0044112 A1* | 2/2018 | Fujiwara | G06Q 10/087 |
| 2020/0202088 A1* | 6/2020 | Laffargue | G06K 7/1417 |

* cited by examiner

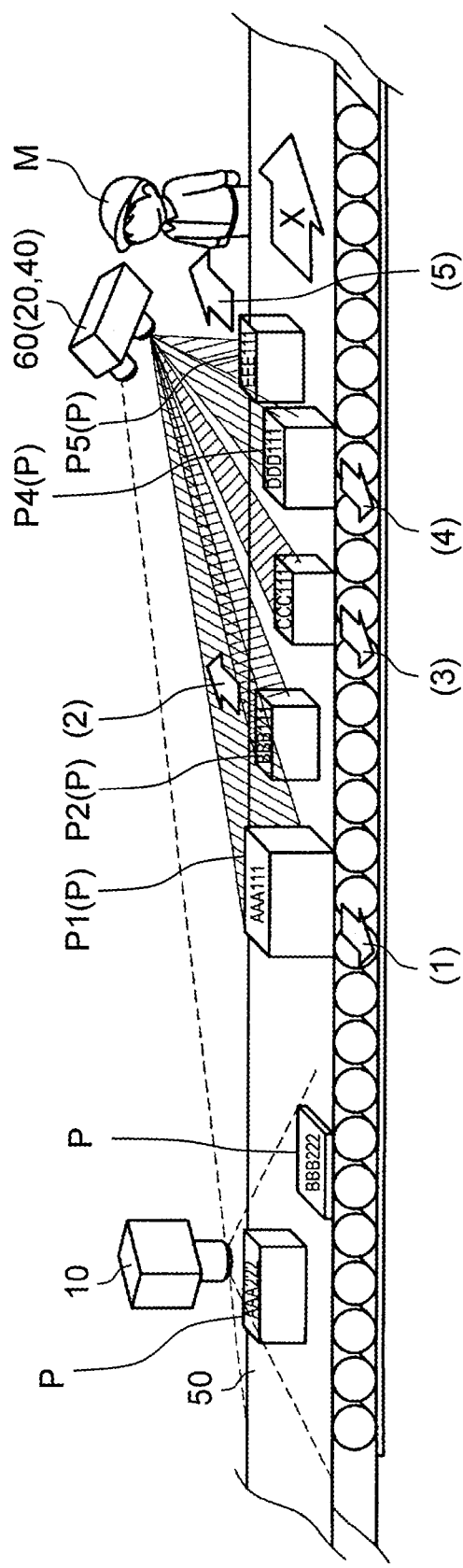
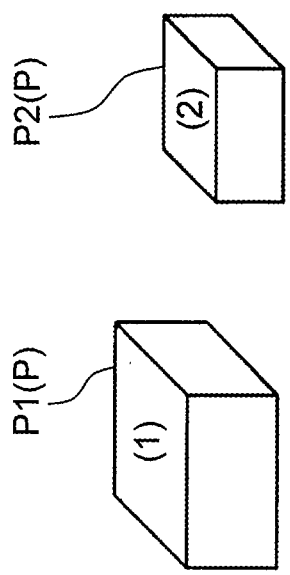

PROJECTION INDICATION DEVICE, PARCEL SORTING SYSTEM, AND PROJECTION INDICATION METHOD

TECHNICAL FIELD

The present disclosure is related to a projection indication device, a parcel sorting system, and a projection indication method useful to sort parcel.

BACKGROUND ART

As recent economic activity rises, the amount of parcel circulation tends to increase. In a circulation process of parcels, sorting work for sorting the parcel by destination is a time-consuming process and relies on manual work from before, but a technology of automating at least a part of the sorting work is proposed.

PTL 1 discloses a system in which moving parcel is tracked, an image to be displayed is determined based on information related to the parcel read from the parcel and information of a position of the parcel, and the image is projected from a projector to display the image on the parcel.

CITATION LIST

Patent Literature

PTL 1: U.S. Pat. No. 7,090,134

SUMMARY OF THE INVENTION

Technical Problem

Meanwhile, in recent years, the amount of parcel circulation has been increased more and more and types of parcel have also become various, so that a technology of effectively and precisely sorting the parcel is required.

The present disclosure is related to the technology of effectively and precisely sorting the parcel.

Solutions to Problem

According to the present disclosure, there is provided a projection indication device that generates a projection image to be projected on parcel based on sensing information of the parcel, the device including: a processor; and a memory, in which by cooperating with the memory, the processor specifies parcel based on a distance image of the parcel included in sensing information, tracks the parcel based on a color image of the parcel included in the sensing information, and tracks the parcel based on the distance image of the parcel in a case where the color image of the parcel on which a projection image is projected includes a white region expressed in white which is not an original gradation.

According to the present disclosure, there is provided a parcel sorting system including: the projection indication device described above; a label reader that reads parcel identification information from a label attached to parcel; an image sensor that obtains the distance image and the color image; and an image projection device that projects the projection image on the parcel.

According to the present disclosure, there is provided a projection indication method of generating a projection image to be projected on parcel based on sensing information of the parcel, the method including: by causing a processor to cooperate with a memory, specifying the parcel based on a distance image of parcel included in sensing information, tracking the parcel based on a color image of the parcel included in the sensing information, and tracking parcel based on a distance image of the parcel in a case where a color image of the parcel on which a projection image is projected includes a white region expressed in white which is not an original gradation.

According to the present disclosure, it is possible to more effectively and precisely sort parcel and to further deal with an increase in the amount of parcel circulation. Specifically, it is possible to prevent tracking accuracy of parcel from deteriorating even when overexposure occurs due to projection of a projection image.

BRIEF DESCRIPTION OF DRAWINGS

FIG. 3A is a conceptual diagram illustrating a status in which the parcel sorting system is installed in a distribution center and is in operation.

FIG. 3B is a diagram illustrating a state in which a projection image including a number is projected on an upper surface of parcel.

DESCRIPTION OF EMBODIMENTS

Hereinafter, embodiments (hereinafter, referred to as "present embodiment") which specifically disclose a projection indication device, a parcel sorting system, and a projection indication method according to the present disclosure will be described in detail with reference to appropriate drawings. However, in some cases, an unnecessarily detailed explanation may be omitted. For example, in some cases, a detailed explanation of already well-known items and a repetition explanation of substantially the same configuration may be omitted. This is to avoid unnecessary repetition of the following description and to facilitate understanding by those skilled in the art. The accompanying drawings and the following description are provided to enable those skilled in the art to fully understand the present disclosure and are not intended to limit a scope of the claims.

Hereinafter, the embodiments of the disclosure will be described with reference to FIGS. 1 to 6.

[Configuration]

Figure 1:
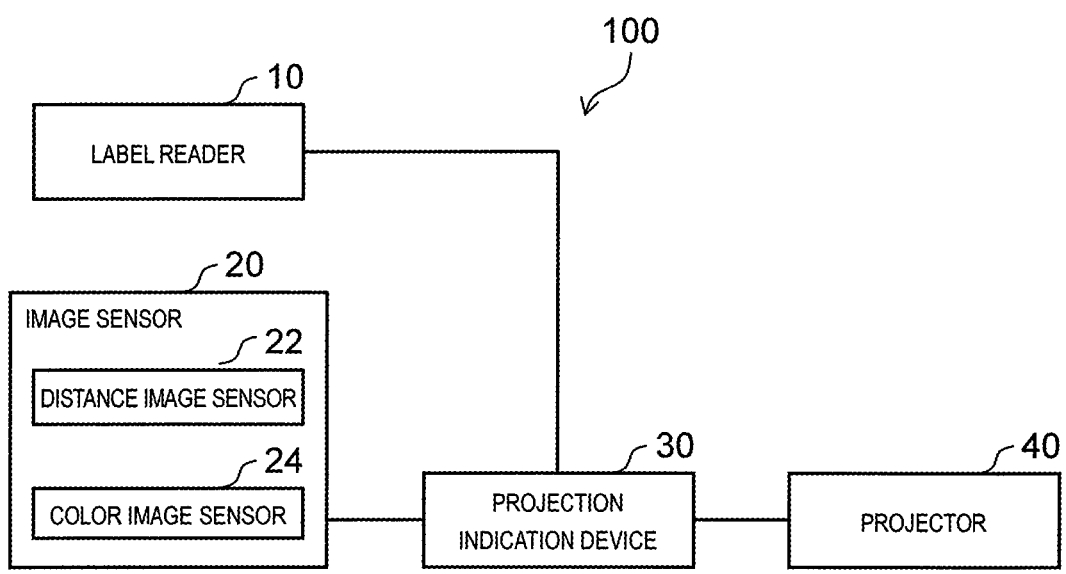
FIG. 1 is a block diagram illustrating a configuration of a parcel sorting system according to an embodiment.

FIG. 1 is a block diagram illustrating a configuration of the parcel sorting system according to the embodiment. Parcel sorting system 100 illustrated in FIG. 1 is installed in, for example, a distribution center. Parcel sorting system 100 includes label reader 10, image sensor 20, projection indication device 30, and projector 40. Parcel sorting system 100 is a system which supports work of a worker who sorts parcel transported by a transport conveyor. Parcel sorting system 100 is installed at the distribution center owned by, for example, a retailer, a wholesaler, an internet distributor, or the like. Parcel to be sorted generally has an approximately rectangular parallelepiped shape, but the outward shape of the parcel is not particularly limited, and a type of the parcel is also not particularly limited. The configuration of the parcel sorting system is not limited to the configuration illustrated in FIG. 1. For example, one label reader 10 may be connected with a plurality of image sensors 20, a plurality of projection indication devices 30, and a plurality of projectors 40. The number of each component can be appropriately modified according to the purpose.

Label reader 10 as a reading device is a device which includes various components such as a lens (not illustrated), an image sensor, and the like. By using label reader 10, it is possible to read label recording information including various types of information related to the parcel from a label attached to the parcel transported by the transport conveyor. By using the read label recording information, it becomes possible to specify the parcel. By the read information, parcel identification information is defined.

Image sensor 20 is an imaging device which includes various components such as a lens (not illustrated), an image sensor, and the like. Image sensor 20 is generally configured by an imaging camera. The imaging camera is a three-dimensional camera, a plurality of two-dimensional cameras, or the like. Image sensor 20 includes distance image sensor 22 and color image sensor 24.

Distance image sensor 22 images the parcel transported by the transport conveyor and generates a distance image. The generated distance image is used as information indicating a position of the parcel, a distance to the parcel, a size of the parcel, and the like. "Distance image" means an image including distance information indicating a distance from an imaging position to a position (including a surface of parcel) indicated by each of pixels (that is, "image" in the present disclosure includes a distance image). In addition, a term of "distance image" includes one which cannot be recognized as an image by human eyes, such as a table or the like listing numerical values indicating a distance. That is, "distance image" may be information indicating a relationship between coordinates and a distance in the imaged region, and a data structure is not limited thereto. In the present disclosure, distance image sensor 22 is used for specifying the position of the parcel. Therefore, distance image sensor 22 also can be replaced with another sensing device (an ultrasonic sensor, an infrared sensor, a stereo camera, and a monocular video camera).

Color image sensor 24 images parcel generated by the distance image and generates a color image. "Color image" refers to an image in which a color of a surface of parcel is expressed with a predetermined gradation, and the "gradation" includes not only 256 gradations of RGB but also all kinds of grayscales or the like. Color image sensor 24 in the present disclosure is used for tracking each parcel, for the parcel specified by distance image sensor 22. Color image sensor 24 also can be replaced with another sensing device (an ultrasonic sensor, an infrared sensor, a stereo camera, and a monocular video camera).

That is, in the present disclosure, a term of "image" includes both of a distance image and a color image. In the present disclosure, information output from an image sensor as a sensing device including a distance image sensor and a color image sensor is referred to as sensing information. In the present embodiment, an example of the sensing device will be described by using image sensor 20 (including distance image sensor 22 and color image sensor 24). In addition, in the present embodiment, an example of the sensing information will be described by using a distance image output by distance image sensor 22 and a color image output by color image sensor 24.

Figure 2:
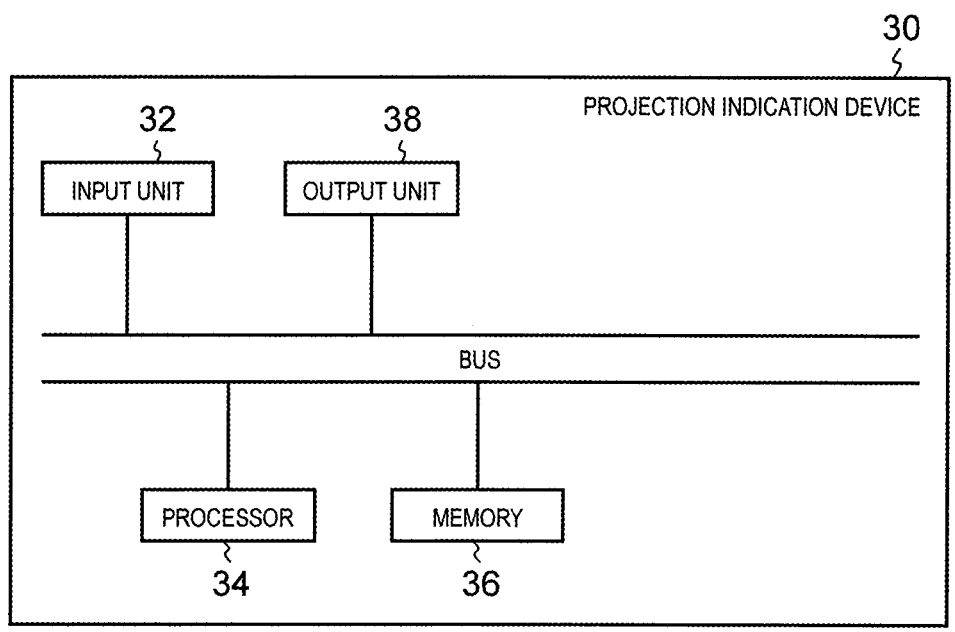
FIG. 2 is a block diagram illustrating a configuration of a projection indication device according to the embodiment.

Projection indication device 30 functions as a calculation device in parcel sorting system 100. As illustrated in FIG. 2, projection indication device 30 includes input unit 32, processor 34, memory 36, and output unit 38 connected with one another via a bus. Input unit 32 receives parcel identification information for specifying parcel obtained from the label recording information read by label reader 10, a distance image generated by distance image sensor 22, and a color image generated by color image sensor 24. Processor 34 is configured by a general calculation device and generates a projection image to be projected on parcel based on the parcel identification information, the distance image, and the color image. Memory 36 as a storage device reads a control program necessary for various processes by processor 34 and performs an operation such as data backup. That is, processor 34 and memory 36 control various processes by projection indication device 30 by cooperating with each other. Output unit 38 outputs the projection image generated by processor 34 to projector 40. In the present disclosure, "processor" does not mean only a single processor. "Processor" means an operator having a plurality of processors having an identical purpose, or a plurality of processors having different purposes in a case where they perform processes in collaboration with one another (for example, general-purpose central processing unit (CPU) and a graphic processing unit (GPU)).

Projector 40 is configured by a general projection device, and projects projection light including the projection image received from projection indication device 30, on the parcel and displays the projection image onto the parcel.

Parcel sorting system 100 can be configured to include label reader 10, image sensor 20 (distance image sensor 22 and color image sensor 24), projection indication device 30, and projector 40 connected with one another in wired communication or in wireless communication. In addition, parcel sorting system 100 also can be configured to include two or more devices of any of label reader 10, image sensor 20, projection indication device 30, and projector 40 as an integral device. For example, image sensor 20 and projector 40 can be combined to construct an integral imaging projection device (see FIG. 3A).

[Outline of System]

FIG. 3A is a conceptual diagram illustrating a status in which parcel sorting system 100 is installed in the distribution center and is in operation. In the related art, each of workers M visually checks the label attached to each parcel P transported by transport conveyor 50 in the arrow X-direction. When the parcel to be delivered by the worker himself arrives, worker M needs to pick up the parcel and place the parcel once in the vicinity such as the worker's own feet, a basket, a truck bed. Meanwhile, in a case of visually sorting by the worker, there is a limit in work efficiency of the worker, so that it is necessary to limit a transport speed to a predetermined value or less. As a result, a limit value of the amount of parcel which the worker can sort in a unit time, was few. In addition, due to an erroneous recognition when the worker visually checks the label, there is a possibility that an error may occur at the time of sorting. In recent years, the amount of parcel circulation has increased, and these problems receive more attention.

In the present embodiment, as illustrated in FIG. 3A, label reader 10 disposed above transport conveyor 50 reads the label attached to each parcel P transported by transport conveyor 50. In the label, the label recording information including various information related to the parcel is described. The label recording information includes information similar to a parcel identification number individually assigned to the parcel, a name, an address, and a telephone number of a sender, a name, an address, and a telephone number of a receiver, a parcel type, and the like. The label may be read by the worker in charge by manually placing a barcode reader as label reader 10 to a barcode in the label.

Further, image sensor 20 images the image (the distance image and the color image) of parcel P transported by transport conveyor 50 and obtains information such as a position of parcel P, a distance to parcel P, a size (lengths of three sides when parcel P is rectangular parallelepiped) of parcel P, a color of parcel P, a pattern of parcel P, and the like. Further, positions of label reader 10 and image sensor 20, a type of the sensing device, and an order of processes are not particularly limited to the illustrated embodiments. As described above, in the present example, image sensor 20 and projector 40 are configured as an integrated imaging projection device 60 and are disposed above transport conveyor 50.

Projection indication device 30 (not illustrated in FIGS. 3A and 3B) is configured by a computer disposed in, for example, the vicinity of transport conveyor 50 or another room and generates the projection image to be displayed on parcel P (for example, upper surface when parcel P is rectangular parallelepiped) based on the information, obtained by label reader 10, specifying the parcel and the distance image and the color image generated by image sensor 20. Projection indication device 30 transmits a projection indication to project the projection image on parcel P, to projector 40.

Figure 4:
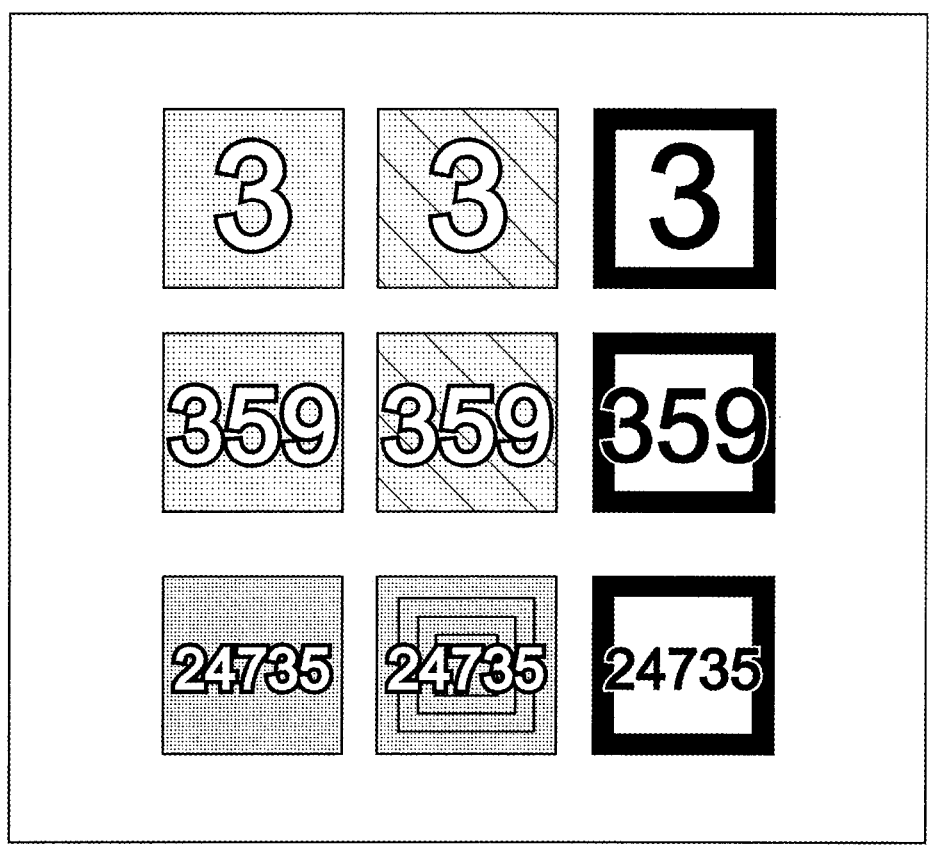
FIG. 4 is a diagram illustrating an example of a projection image generated by the projection indication device according to the embodiment.

Projector 40 which receives the projection indication, as an image projection device, projects projection light including the projection image generated by projection indication device 30 on parcel P and displays the projection image on parcel P. Here, the projection image displayed on parcel P is, for example, an image of an encircled number having a color indicating a sorting location corresponding to a delivery address of parcel P (see FIG. 3B). Here, the encircled number corresponds to, for example, a number of a truck carrying sorted parcel P (a number of the truck itself, a parking lot number, or the like), a number of a shelf or a box to be carried into the truck, or the like. Further, instead of directly corresponding to the number such as the shelf or the box, the encircled number may correspond to a number of a shooter which moves the picked-up parcel to another location or a truck. Since a parking position of the truck or the like frequently changes according to a traffic condition or the like, it may be difficult to correspond to the sorting destination viewed from the periphery of transport conveyor 50 at any time. Therefore, the shooter is sandwiched between transport conveyor 50 and the transport truck, and a number of the shooter is projected on the periphery of transport conveyor 50, so that even if a configuration on the periphery of the transport conveyor 50 is not changed as needed, it is possible to deal with the change of the sorting destination by disposing an opening of the shooter. Certainly, according to a status, various types of projection images are displayed. Another example of displaying the number may be a zip code corresponding to the delivery address, a number of a worker who picks up parcel P, or the like. In addition, as an example of displaying information other than the number, an arrow indicating the sorting direction (such as right or left in a transport direction of transport conveyor 50) or characters (such as "left" and "right") may be used. Further, a display form is not limited to the encircled number, and various types such as numbers surrounded by squares ("3", "359", and "24735") as illustrated in FIG. 4 are conceivable. Furthermore, the projection image is not limited to numbers or characters enclosed with a frame, but may be white numbers or characters with a solid background. In addition, the shape of the number or character to be displayed such as a circle, a triangle, a square, or the like may be switched according to information to be displayed. Further, a picture capable of being individually associated with each information to be displayed may be displayed. The projection image is not limited to a still image, and may be an animation. As an example of the animation, the example described above may be blinked, enlarged or reduced, and a color may be changed. An animation reflecting the sorting direction may be projected. An example of the animations reflecting the sorting direction may include various patterns, for example, a moving light ray or light spot in the sorting direction, forming all or a part of the projection image in the sorting direction, changing the color of the projection image in the sorting direction, and displaying an arrow moving in the sorting direction, and the like. In a case where only a part of the projection image is a target of the animation, a part having a large influence on determination of the sorting destination by a worker, such as a number, an arrow, or the like, may be not changed, and a part not affected by the sorting destination such as a frame line may be changed. Meanwhile, in a situation in which it is more efficient to convey the sorting direction more intuitively than the meaning of the number or the like projected within the frame line, such as a case where there are few options for the sorting destination, a number, an arrow, or the like may be moved in the sorting direction within a fixed frame. The animation may be repeatedly projected or may be projected only once. In the present disclosure, "image projection device" is not limited to a device which directly projects a light beam on the parcel. In the present disclosure, "image projection device" includes glasses which can display the image. That is, in the present disclosure, in a case of expressing as projecting projection light on the parcel, displaying the image on the parcel, projecting the image on the parcel, or the like, the expression also includes allowing the worker to recognize the image via the glasses capable of displaying the image in a pseudo manner as if the projection light is projected on the parcel. That is, in a case where the worker wears special glasses capable of displaying the image, the projection image of parcel P may be superimposed on the image of parcel P viewed via the glasses.

In FIG. 3A, worker M (omitted for other workers) in charge of picking up the parcel stands beside transport conveyor 50 and the parcel arriving each region is picked up from transport conveyor 50 as indicated by encircled number 1, encircled number 2, encircled number 3, or the like.

For example, parcel P1 has parcel identification information of "AAA111" on a label, and the parcel identification information of "AAA111" specifies that the parcel is a target to be sorted in region A. Here, when parcel P1 reaches the specific region, processor 34 transmits the generated projection image to projector 40 as illustrated in FIG. 3B. Projector 40 projects the projection image on parcel P1. The worker in the region can easily pay attention to parcel P1, to be picked up by the worker, which reaches the specific region of the worker, accordingly, the parcel can be sorted more efficiently and precisely.

In the present embodiment, as illustrated in FIG. 3A, whether or not one projector 40 projects the image on a plurality of specific regions may be switched and whether or not a plurality of projectors 40 project the image on each of the specific regions may be switched.

Hereinafter, in parcel sorting system 100 according to the embodiment, an outline of an operation of sorting the parcel performed by projection indication device 30 will be described.

[Outline of Operation]

Figure 5:
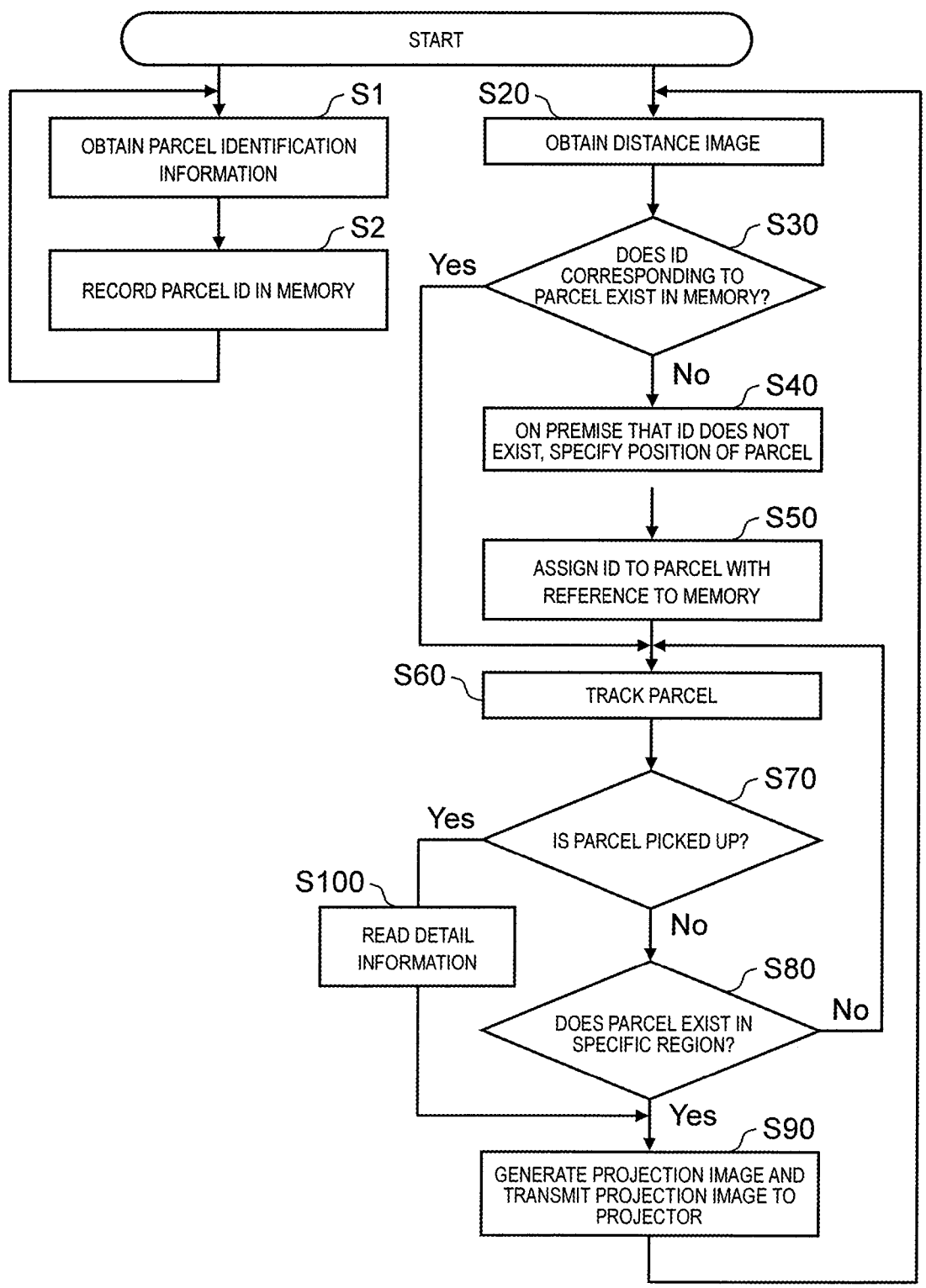
FIG. 5 is a flowchart illustrating an outline procedure of an operation mainly performed by the projection indication device.

FIG. 5 is a flowchart illustrating an outline procedure of an operation of mainly performed by projection indication device 30 of the present embodiment, particularly processor 34 of projection indication device 30. First, after label reader 10 reads the label recording information of the label of the parcel, input unit 32 of projection indication device 30 obtains the parcel identification information corresponding to the label recording information from label reader 10 (step S1). The parcel identification information is information including at least one piece of information similar to the parcel identification number individually assigned to the parcel, the name, the address, and the telephone number of the sender, the name, the address, and the telephone number of the receiver, the parcel type, and the like. For the parcel identification information, processor 34 assigns an ID as a parcel identification number specifying the parcel and records the ID and time information corresponding to a time at which the ID is assigned, in memory 36 (step S2). The ID recorded in memory 36 may be the parcel identification number originally recorded in the parcel identification information or may be assigned by projection indication device 30 generating a new ID.

On the other hand, in parallel with step S1 and step S2, after distance image sensor 22 of image sensor 20 images the distance image of the parcel, input unit 32 of projection indication device 30 obtains the distance image as the sensing information from distance image sensor 22 (step S20). Processor 34 determines whether or not the ID corresponding to the parcel existing in the distance image exists in memory 36.

An example of a method of determining whether or not the ID corresponding to the parcel existing in the distance image exists in memory 36 is as follows. That is, processor 34 calculates a time required for the parcel to move between label reader 10 and distance image sensor 22 by a distance (assumed to be known) between label reader 10 and distance image sensor 22 and a speed of transport conveyor 50. By subtracting the time from a time when the distance image is obtained, a time when the ID is assigned to the parcel existing in the distance image by label reader 10 (or processor 34) can be estimated. It can be estimated that the ID assigned close to the estimated time is the ID corresponding to the parcel existing in the distance image. In addition, as another example, a method of installing another distance image sensor in the vicinity of label reader 10 may be possible. That is, by tracking the parcel, to which the ID is assigned, by using another distance image sensor installed in the vicinity of label reader 10 since label reader 10 assigns the ID (or processor 34), a distance between the parcel (or the ID) and label reader 10 is measured for a time unit. Processor 34 can estimate the ID of the parcel in the distance image obtained in predetermined step S20 by the measured distance between the parcel (or the ID) and label reader 10, a distance of the parcel in the distance image obtained in step S20, and a distance (assumed to be known) between two distance image sensors.

In this way, processor 34 determines whether or not the ID corresponding to the parcel included in the distance image exists in memory 36 (step S30). That is, as described in step S2, in memory 36, the parcel identification information, the ID, and the time information corresponding to a time when the ID is assigned are recorded in advance. On the other hand, as described above, for example, when processor 34 subtracts the time required for the parcel to move between label reader 10 and distance image sensor 22 from the time when the distance image is obtained, a time when the ID is assigned to the parcel existing in the distance image by label reader 10 (or processor 34) can be estimated. Processor 34 compares the time information recorded in memory 36 in advance and the estimated time. In a case where the time information is close to the estimated time (for example, a case where a time difference is equal to or smaller than a predetermined time), processor 34 can determine that the ID corresponding to the parcel included in the distance image exists in memory 36. In a case where it is determined that the ID corresponding to the parcel exists in memory 36 (Yes in step S30), the process moves to step S60 and subsequent steps.

In a case where it is determined that the ID corresponding to the parcel does not exist in memory 36 (No in step S30), on the premise that the ID is not assigned to the parcel, processor 34 specifies the position of the parcel again (step S40) and assigns the ID to the parcel (step S50).

In parallel with the above steps, color image sensor 24 generates a color image for each parcel of which a distance image is obtained. Processor 34 tracks the parcel, to which the ID is attached, transported and moved by transport conveyor 50 based on the color image from color image sensor 24 obtained by input unit 32 (step S60). Based on the color image likewise, processor 34 determines whether or not the worker picks up the tracked parcel (step S70). In a case where it is determined that the parcel is not picked up by the worker (No in step S70), processor 34 determines whether or not the parcel exists in a specific region (a predetermined region in which parcel is to be picked up) described below. In a case where it is determined that the parcel exists (reaches) in the specific region (Yes in step S80), processor 34 generates the projection image and transmits the projection image to projector 40 (step S90). In a case where it is not determined that the parcel exists (reaches) in the specific region (No in step S80), the process returns to step S60 and processor 34 continues to track the parcel.

In addition, in step S70, in a case where it is determined that the parcel is picked up by the worker (Yes in step S70), processor 34 reads detail information of the parcel from memory 36 (step S100), generates the projection image including the detail information, and outputs the projection image generated by output unit 38, to projector 40 (step S90). Projector 40 which obtains the projection image from projection indication device 30, projects the projection image on the corresponding parcel.

The above is the outline of the operation procedure performed by processor 34 and the like of projection indication device 30. Certainly, the operation procedure is not limited to that described above. For example, the determination in step S70 can be omitted. In addition, for the determination in step S70, it is possible to use contact determination between a hand of the worker and the parcel, a color image, a distance image, or the like. Next, a specific case of the present disclosure will be described.

[Switching Images Used For Tracking]

In the related art, a so-called overexposure problem is known in a field of a digital camera. In a bright imaging region within an imaging target, if a gradation of the digital camera exceeds a reproducible range, the gradation of the generated image may be lost and the generated image may become white. This problem may occur in projection indication device 30 and parcel sorting system 100. For example, in the example in FIG. 5, as described in step S90, projector 40 which obtains a projection image from projection indication device 30, projects the projection image on corresponding parcel. At this time, when the parcel is brightly illuminated by projection light, a brightness of a projected area of the parcel may exceed a brightness captured by color image sensor 24. The white region described above is generated in a color image (overexposure occurs), an original color of the parcel cannot be expressed, and it is difficult to specify the parcel, and further, there is a possibility that the parcel cannot be tracked.

In the present disclosure, in a case of detecting a white region in which an original color of parcel, that is, a gradation to be originally expressed is not expressed, when tracing the parcel in step S60 in FIG. 5, it is possible to track the parcel by switching from tracking based on color information into tracking based on distance information, that is, switching from tracking based on a color image into tracking based on a distance image.

That is, basically, processor 34 specifies parcel and attaches an ID based on a distance image of the parcel included in sensing information as described in steps S20 to S50 in FIG. 5, and then tracks the parcel based on a color image of parcel included in the same sensing information as described in step S60. Meanwhile, in a case where overexposure occurs in a color image of parcel due to a projection image being projected by projector 40, processor 34 terminates tracking based on the color image and switches from the tracking based on the color image into tracking based on a distance image. Accordingly, it is possible to prevent tracking accuracy of the parcel from deteriorating.

Figure 6:
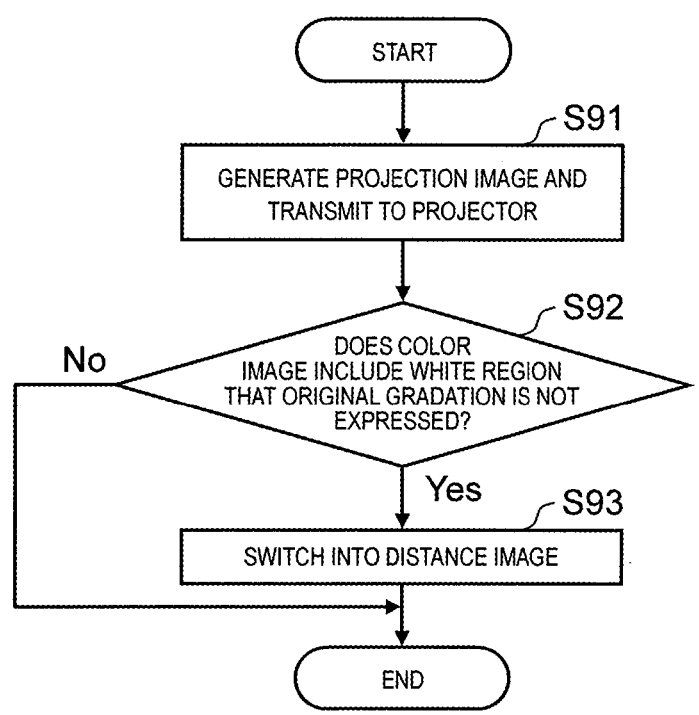
FIG. 6 is a flowchart illustrating a procedure for switching images used for tracking parcel.

FIG. 6 is an example of a flow corresponding to the process described above. The flow illustrated here indicates the detailed process in step S90 in the flowchart of the outline procedure in FIG. 5. That is, as described in step S90, processor 34 generates a projection image, and output unit 38 outputs the generated projection image to projector 40 (step S91). Projector 40 which obtains the projection image from projection indication device 30, projects the projection image on the corresponding parcel. Here, processor 34 determines whether or not so-called overexposure occurs in the image. That is, processor 34 determines whether or not the color image includes a white region in which an original color of a portion of parcel on which the projection image is projected, that is, an original gradation is not expressed (step S92).

Since the process is terminated as it is in a case where overexposure does not occur (No in step S92), parcel tracking by the color image is executed as it is. On the other hand, in a case where overexposure occurs (Yes in step S92), processor 34 switches an image for tracking the parcel from the color image into a distance image (step S93). As a result, it is possible to prevent tracking accuracy of the parcel from deteriorating regardless of occurrence of overexposure, and to track the parcel with high accuracy.

As described above, according to the present disclosure, by switching the image used for tracking parcel, it is possible to track the parcel with high accuracy. Meanwhile, the process flow in FIG. 5 and FIG. 6 described above is merely an example. A timing and an order of attaching the ID to parcel or projecting a projection image are arbitrary, and it is possible to cope with overexposure by switching from tracking based on a color image into tracking based on a distance image.

Although the embodiment of a projection indication device, a parcel sorting system, and a projection indication method according to the present disclosure is described with reference to the drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure.

For example, the following modification example can be considered.

In the embodiment described above, processor 34 may extract a feature amount of parcel to be tracked from the color image generated by color image sensor 24 so as to perform tracking. The feature amount includes various examples such as a color or luminance distribution, and a pattern of a specific portion in a color image. In addition to the examples described above, various information used as the feature amount and an extraction or evaluation method thereof are known in the field of image recognition, and are omitted in the present disclosure.

In a case of using a feature amount, even if a portion of a color image, such as a portion corresponding to an edge of parcel, is overexposed, the parcel can be identified, in some cases. Therefore, at a time of detecting that overexposure occurs, tracking based on the color image, without switching into tracking based on a distance image, may be continued until a proportion of a region in which the overexposure occurs exceeds a certain value and the parcel cannot be recognized due to the region in which the overexposure occurs. Generally, since tracking with the color image tends to be more accurate than tracking with the distance image, even in a case where the portion is overexposed, tracking with the color image may have a reliable result than tracking with the distance image.

In addition, in the embodiment described above, in a case of detecting that overexposure occurs, though tracking with the color image is switched into tracking with only the distance image for parcel, the embodiment is not limited thereto. As described above, in a case where overexposure occurs only in a part, there is a possibility that tracking with the color image can be continued. Therefore, in a case of detecting that overexposure occurs, tracking parcel may be continued based on results of both of tracking with the color image and tracking with the distance image. In this case, in a case where the tracking result by the color image and the tracking result by the distance image are different, a difference may be provided in reliability of each tracking result. As the degree of overexposure increases, the reliability result by the color image may be lowered to increase the reliability of the result by the distance image. Depending on a proportion of overexposure included in the color image of the parcel (a proportion of a white region), it may be determined whether to track the parcel according to the tracking result based on the color image or the tracking result based on the distance image. In addition, at this case, a weight of a white region may be increased as its position is closer to a center, which has a higher reliability of determination, of the parcel. The proportion of the white region described above includes a ratio evaluated after performing such a weighting. When tracking only a single piece of parcel, a tracking result with higher reliable may be simply used. But, in many cases, a plurality of parcels to be tracked are transported at the same time, so in a case of comprehensively evaluating the parcels being transported at the same time, it is more likely that tracking accuracy is higher if a statistical process is performed in consideration of a tracking result with low reliability.

In addition, in the embodiment described above, occurrence of overexposure is detected from a color image actually obtained by color image sensor 24, but the embodiment is not limited thereto. As described above, processor 34 has a function of obtaining color image information generated by color image sensor 24 and a function of generating a projection image to be projected on parcel. Therefore, by artificially synthesizing the color image information and the projection image in processor 34, it is possible to predict whether or not overexposure occurs in a case where the image is actually projected on the parcel. In this case, by predicting occurrence of overexposure and switching in advance into a distance image used for tracking the parcel, a tracking method can be switched more smoothly than in the embodiment in which the process is performed after the overexposure occurs.

Since occurrence of overexposure is also affected by factors which processor 34 cannot control, such as a change in ambient light, from the viewpoint of accuracy, it is also effective to switch the image used for tracking after actually detecting the occurrence of overexposure as described in the embodiment. Therefore, the image used for tracking the parcel may be switched in consideration of both results of the prediction of occurrence of overexposure by pseudo synthesis and the detection of occurrence of overexposure based on the color image actually generated by color image sensor 24. For example, in a case where it is predicted that overexposure occurs from the pseudo synthesis result, it is conceivable to switching into tracking using a distance image even if overexposure does not occur yet in an actual color image. Further, in a case where it is predicted that overexposure occurs, by associating and managing an ID of parcel in which it is predicted that overexposure occurs and a region of a distance image corresponding to a color image of the parcel, it is possible to suppress a tracking error when switching from tracking using the color image to tracking using the distance image.

INDUSTRIAL APPLICABILITY

The present disclosure is useful to provide a projection indication device, a parcel sorting system, and a projection indication method capable of preventing tracking accuracy of parcel from deteriorating even when overexposure occurs.

REFERENCE MARKS IN THE DRAWINGS

10 LABEL READER
20 IMAGE SENSOR
22 DISTANCE IMAGE SENSOR
24 COLOR IMAGE SENSOR
30 PROJECTION INDICATION DEVICE
32 INPUT UNIT
34 PROCESSOR
36 MEMORY
38 OUTPUT UNIT
40 PROJECTOR
50 TRANSPORT CONVEYOR
60 IMAGING PROJECTION DEVICE
100 PARCEL SORTING SYSTEM
P PARCEL

The invention claimed is:

1. A projection indication device that generates a projection image to be projected on a parcel based on sensing information of the parcel, the projection indication device comprising:

a processor; and
a memory,
wherein by cooperating with the memory, the processor
specifies the parcel based on the sensing information,
tracks the parcel based on a color image of the parcel included in the sensing information, and
tracks the parcel based on a distance image of the parcel included in the sensing information, in a case where the color image of the parcel on which a projection image is projected includes a white region expressed in white which is not an original gradation.

2. The projection indication device of claim 1,
wherein the processor continues tracking of the parcel based on the color image when the parcel is able to be indentified even if the color image of the parcel includes the white region.

3. The projection indication device of claim 2,
wherein in a case where tracking of the parcel based on the color image is continued even if the white region is included in the color image of the parcel, the processor performs tracking on the parcel by lowering reliability of a tracking result of the parcel based on the color image from reliability of a tracking result of the parcel in a case where the white region is not included.

4. The projection indication device of claim 2,
wherein in a case where tracking of the parcel based on the color image is continued even if the white region is included in the color image of the parcel, the processor determines whether to track the parcel depending on a tracking result based on the color image or a tracking result based on the distance image, according to a proportion of the white region included in the color image of the parcel.

5. The projection indication device of claim 1,
wherein the processor determines whether or not the color image of the parcel on which the projection image is projected includes the white region before the projection image is projected on the parcel, by synthesizing the color image and the projection image of the parcel.

6. The projection indication device of claim 5,
wherein in a case where the processor determines that the color image of the parcel includes the white region before the projection image is projected on the parcel, the processor associates and manages a region of the distance image corresponding to the color image of the parcel and information identifying the parcel.

7. The projection indication device of claim 1,
the processor tracks the parcel based on only the distance image of the parcel in the case where the color image of the parcel on which the projection image is projected includes the white region.

8. A parcel sorting system comprising:
the projection indication device of claim 1;
a label reader that reads parcel identification information from a label attached to the parcel;
an image sensor that obtains the distance image and the color image; and
an image projection device that projects the projection image on the parcel.

9. A projection indication method of generating a projection image to be projected on parcel based on sensing information of the parcel, the projection indication method comprising:
by causing a processor to cooperate with a memory,
specifying the parcel based on the sensing information,
tracking the parcel based on a color image of the parcel included in the sensing information, and tracking the parcel based on a distance image of the parcel included in the sensing information, in a case where the color image of the parcel on which a projection image is projected includes a white region expressed in white which is not an original gradation.

10. The projection indication device according to claim 1, wherein the processor specifies the parcel based on the distance image of the parcel, the distance image being included in the sensing information.

11. The projection indication method according to claim 9, wherein, in the specifying, the parcel is specified based on the distance image of the parcel, the distance image being included in the sensing information.

* * * * *